Figure 1:
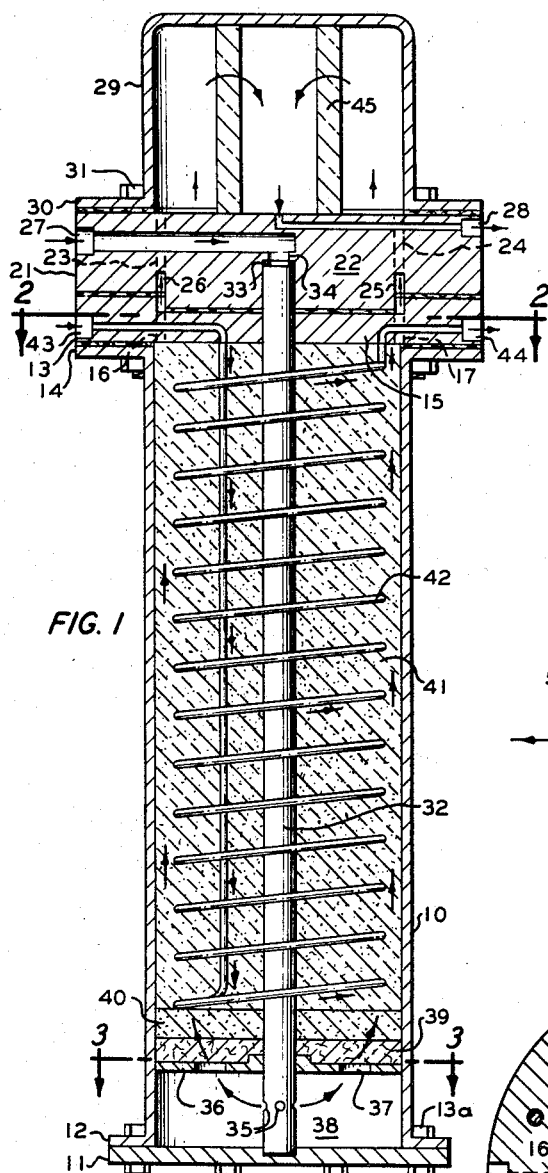

July 19, 1960 S. J. MURRAY 2,945,911
REMOVAL OF METAL HALIDE CATALYST FROM HYDROCARBONS
Filed Oct. 3, 1958

INVENTOR.
S. J. MURRAY
BY Hudson & Young
ATTORNEYS

United States Patent Office 2,945,911
Patented July 19, 1960

2,945,911
REMOVAL OF METAL HALIDE CATALYST FROM HYDROCARBONS

Stephen J. Murray, Phillips, Tex., assignor to Phillips Petroleum Company, a corporation of Delaware Filed Oct. 3, 1958, Ser. No. 765,130

20 Claims. (Cl. 260—683.74)

This invention relates to the purification of hydrocarbon streams. In one aspect, this invention relates to a method for removing metal halide catalyst from reaction effluents obtained in hydrocarbon conversions carried out in the presence of metal halide catalyst. In another aspect, this invention relates to a method for removing Friedel-Crafts type metal halides from hydrocarbon streams. In another aspect, this invention relates to a filter apparatus for purifying hydrocarbon streams containing a metal halide. In another aspect, this invention relates to a method for producing the double salt of a metal halide of the Friedel-Crafts type and an alkali metal halide.

Metal halides of the Friedel-Crafts type have been used in numerous processes for the conversion of hydrocarbons, including the decomposition or cracking of high-boiling hydrocarbons, isomerization of low-boiling hydrocarbons, polymerization of olefins, and alkylation of alkylatable hydrocarbons. The effluent obtained from the reaction zone of such processes usually contains a small amount of the metal halide catalyst, sometimes in an amount as small as about 0.01 percent. Although this amount of metal halide in the hydrocarbon stream may be small and the metal halide may be completely soluble in the hydrocarbon, the presence of the metal halide in the hydrocarbon stream gives rise to numerous troubles in process equipment. These metal halides result in serious fouling of heat exchangers, condensers, reboilers and other parts of the equipment used in the process. In addition, corrosion is a serious problem resulting in malfunctioning of valves, pumps, control mechanisms, and the like. A major obstacle is encountered in reaction systems where a clean, representative sample of a hydrocarbon stream must be obtained for analysis in automatic analyzing equipment.

Methods resorted to heretofore to effect the separation of metal halides from hydrocarbon streams include adsorption on surface active media such as bauxite and charcoal, water washing, and flash evaporation. Separation of entrained metal halide can be achieved to a substantial degree by passage of the hydrocarbon stream through a bed of highly adsorptive material; however, such adsorbents are not very effective in removing metal halide contaminants dissolved in the hydrocarbon stream. Another disadvantage to the use of adsorbents is that the adsorptive material usually contains a sufficient amount of water to form corrosive hydrogen halides which cause serious corrosion problems in the apparatus. Water washing is an effective method for removing metal halides from hydrocarbon streams and is simple in principle; however, complicated mechanical equipment is required since the water forms corrosive hydrogen halides from the metal halides. Also, where the hydrocarbon stream is to be analyzed for hydrogen halide content, water washing can not be used to remove the metal halide since the hydrogen halide content has been changed in the water washing process. Flash evaporation of the sample stream is an effective method for removing metal halides from hydrocarbon streams provided the ratio of heavy to light hydrocarbons is constant and provided the flash temperature can be maintained low enough to minimize the carryover of metal halide. The temperature and pressure of flashing are very critical so that this method of removing metal halides is difficult to control.

It is well known that Friedel-Crafts metal halides react with many alkali metal halides to form double salts of the type $Me_aX_b.Me_cX_d$ wherein $Me_a$ represents a metal of the Friedel-Crafts type, $X_b$ represents a halogen such as chlorine, bromine or iodine, $Me_c$ represents an alkali metal, and $X_d$ represents a halogen such as chlorine, bromine or iodine. Thus, aluminum chloride reacts with various alkali metal halides to form such double salts as $AlCl_3.NaCl$, $AlCl_3.LiCl$, $AlCl_3.KCl$ and $AlBr_3NaBr$. These binary or double salts are not merely a mechanical mixture of the two salts but involve chemical interaction of the Friedel-Crafts metal halide with the alkali metal halide to form the salt of a definite composition. Ternary salts comprising a Friedel-Crafts metal halide and two different alkali metal halides, for example

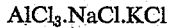
$AlCl_3.NaCl.KCl$ can also be formed. Usually, these multiple salts are prepared by heating the proper proportion of the separate salts in admixture with one another to a temperature above the temperature corresponding to the eutectic mixture. The mixture of salts must be held at reaction temperature for a considerable period of time since the reaction of solid materials is involved and the formation of the multiple salt is very slow.

I have discovered that the formation of a multiple salt of a Friedel-Crafts metal halide and alkali metal halides can be promoted by the presence of a binary or a ternary salt of said Friedel-Crafts metal halide and said alkali metal halides in the reaction mass.

An object of this invention is to provide a method for producing the multiple salts of a Friedel-Crafts metal halide and alkali metal halides in an improved manner.

Another object of this invention is to provide a convenient, economical and highly satisfactory method for purifying the reaction effluents from hydrocarbon conversions carried out in the presence of metal halide catalyst.

Another object of this invention is to provide a method for removing Friedel-Crafts metal halide catalyst from reaction effluents obtained from hydrocarbon conversions carried out in the presence of said metal halide catalyst without substantially altering the composition of said reaction effluents.

Another object of this invention is to provide a method for removing Friedel-Crafts metal halide catalyst from reaction effluents obtained from hydrocarbon conversions carried out in the presence of said metal halide catalyst and promoted with a hydrogen halide without substantially altering the composition of said reaction effluents and without removing said hydrogen halide.

Another object of this invention is to provide a method for removing Friedel-Crafts metal halides from hydrocarbon streams to reduce corrosion and clogging of process equipment.

Another object of this invention is to provide a method for recovering Friedel-Crafts metal halide catalyst from hydrocarbon streams.

Another object of this invention is to provide a filter apparatus for removing Friedel-Crafts metal halides from hydrocarbon streams containing the same.

Other aspects, objects and advantages of the invention are apparent from the consideration of the accompanying disclosure, drawings and the appended claims.

In accordance with this invention, there is provided a method for producing multiple salts of a Friedel-Crafts metal halide and alkali metal halides in an improved manner by reacting said Friedel-Crafts metal halide with said alkali metal halides at an elevated temperature in the presence of a small amount of a multiple salt of a Friedel-Crafts metal halide and an alkali metal halide, usually the multiple salt to be produced by the reaction, and recovering the multiple salt produced in the molten form.

Also, in accordance with this invention, there is provided a method for removing Friedel-Crafts metal halides from hydrocarbon streams by contacting said hydrocarbon streams at an elevated temperature with an alkali metal halide in finely divided form having dispersed therein a small amount of a multiple salt of a Friedel-Crafts metal halide and alkali metal halides. If desired, the alkali metal halide in finely divided form having the multiple salt dispersed therein can be admixed with an inert solid material to serve as a support. The hydrocarbon stream can be contacted with the purifying agent of this invention in either the liquid or the gaseous form; however, the hydrocarbon is preferably in the gaseous form. Preferably, the hydrocarbon and purifying agent are contacted in a filtering type operation whereby the hydrocarbon is passed through a bed of the purifying agent; however, the contacting can also be effected by other operations such as a batch washing operation.

Further, in accordance with this invention, there is provided a purifying agent of novel composition for removing Friedel-Crafts metal halides from hydrocarbon streams without substantially altering the composition of the hydrocarbon streams. The composition of the purifying agent of this invention is as follows:

| Component: | Percent by weight |
| --- | --- |
| Alkali metal halide | 1–99 |
| Multiple salt | 1–50 |
| Inert material | 0–90 |

A preferred composition comprises:

| Component: | Percent by weight |
| --- | --- |
| Alkali metal halide | 50–95 |
| Multiple salt | 5–25 |
| Inert material | 25–75 |

Still further, in accordance with this invention, there is provided a filtering apparatus containing the purifying agent of this invention for removing Friedel-Crafts metal halides from hydrocarbon streams in an efficient manner for use with an automatic control system involving chromatographic analyzers, refractometers and infrared analyzers.

The effectiveness of the purifying agent of this invention is thought to be due to the solubility of the Friedel-Crafts metal halide and other contaminants in the hydrocarbon stream in the multiple salt present in the purification agent. Preferably, the alkali metal salt in the purifying agent composition is present in an amount in excess of the amount of multiple salt present so that the excess of alkali metal halide continuously increases the capacity of the multiple salt for dissolving the Friedel-Crafts metal halide by the formation of multiple salt in situ at the temperature of the purification step. After the purification agent has been used for a considerable period of time to remove Friedel-Crafts metal halides, all of the alkali metal halide has been converted to the multiple salt. However, the multiple salt is still capable of dissolving additional Friedel-Crafts metal halide.

Since Friedel-Crafts metal halides are soluble in double salts of Friedel-Crafts metal halides and alkali metal halides, it would be suspected that Friedel-Crafts metal halides could be removed from hydrocarbon streams by merely contacting the hydrocarbon stream with the alkali metal halide in finely divided form at an elevated temperature to effect formation of the double salt and subsequent removal of the Friedel-Crafts metal halide. However, this method of removing Friedel-Crafts metal halides from hydrocarbon streams has proved inoperable even though there is some double salt formation because the double salt thus formed filled the interstices between the alkali metal halide particles and blocked the flow of hydrocarbon through the material. The use of the double salt alone for the removal of the Friedel-Crafts metal halide also results in a similar difficulty since it is almost impossible to get efficient contact between the hydrocarbon stream and the double salt. Also, the solvency power of the double salt becomes less and less as more Friedel-Crafts metal halide is dissolved. But, as disclosed in this invention, the dispersion of the double salt in the alkali metal halide particles provides double salt nuclei throughout the mass of alkali metal halide so that there are a great many locations at which the reaction of the Friedel-Crafts metal halide and the alkali metal halide can take place to form the double salt and the amount of double salt is gradually increased as the purifying agent is used to remove the Friedel-Crafts metal halide from the hydrocarbon stream. Further, as set forth in this invention, the use of an inert support provides the purifying agent with increased porosity to permit ready flow of the hydrocarbon stream through the purifying agent.

The alkali metal halides used as a reactant for the formation of the double salt and as an ingredient in the purifying agent of this invention can be any of the halides of the left-hand column of Group I of the periodic system; that is, lithium, sodium, potassium, rubidium, and cesium. Although any halide can be used, usually the halide is a chloride or a bromide and infrequently an iodide. Preferably, the alkali metal halide is sodium chloride because of its ready availability.

The Friedel-Crafts metal halides which are used as reactants for the formation of double salts and which are removed from hydrocarbon streams in the purification process of this invention can be the chlorides, bromides, or iodides of zinc, tin, arsenic, antimony, zirconium, titanium, iron, boron, beryllium, and aluminum. The usual Friedel-Crafts metal halides involved in this invention is aluminum chloride and aluminum chloride is the preferred component of the double salt used in the purification agent of this invention.

The temperature employed in the formation of the double salt, as well as in the purification process of this invention, is usually a temperature in range of from 100° C. to 350° C. depending upon the formation temperature of the eutectic mixture corresponding to the double salt. Preferably, the temperature is in the range of 120° C. to 325° C. when the alkali metal halide is sodium chloride, 115° C. to 300° C. when the alkali metal halide is lithium chloride, and 150° C. to 340° C. when the alkali metal halide is potassium chloride.

When the reaction of the Friedel-Crafts halide with the alkali metal halide is promoted by the presence of a small amount of the double salt, usually the reaction is effected in a period of time from about 5 seconds to about 2 hours. The same residence time can also be used in using the purifying agent of this invention for removing Friedel-Crafts metal halides from hydrocarbon streams; however, a considerably longer residence time can be used if desired and no substantial change in the hydrocarbon stream has been detected after the hydrocarbon stream has been in contact with the purifying agent for a period of time up to eight hours.

The reaction of the alkali metal halide with the Friedel-Crafts metal halide is conducted with the alkali metal halide in a granular form, usually of a particle size in the range of from 20 mesh to 200 mesh. An alkali metal halide of this same particle size can also be used as the purifying agent, and, when the alkali metal halide is sodium chloride, to ordinary rock salt of commerce is very suitable. If an inert support material is to be mixed with the alkali metal halide reactant or with the purifying agent, this material should have a particle size in the range of from 4 mesh to 100 mesh with a particle size of 8 mesh being preferred. This inert support material can comprise any of the inert support materials known to those skilled in the art, such as bauxite, asbestos, clay, pumice, and alumina. Preferably, the inert support material is bauxite.

The composition of the double salt produced will vary over a wide range depending upon the nature of the Friedel-Crafts metal halide and the alkali metal halide. Ordinarily, the aluminum chloride-sodium chloride double salt will contain from 38 to 50 percent by weight of sodium chloride with the remainder being aluminum chloride. The lithium chloride-aluminum chloride double salt will ordinarily contain lithium chloride in an amount of from 40 to 52 percent by weight. The double salt can be recovered from the reaction mass by maintaining the reaction mass at an elevated temperature and permitting the double salt, which is in a molten form, to separate from the unreacted reactants.

When it is desired to recover the Friedel-Crafts metal halide from the purification agent after removal of the Friedel-Crafts metal halide from the hydrocarbon stream, the purifying agent can be heated to an elevated temperature sufficient to vaporize the Friedel-Crafts metal halide for its recovery in pure form. The temperature employed will depend upon the particular Friedel-Crafts metal halide involved and can be readily determined by those skilled in the art.

Figure 4:
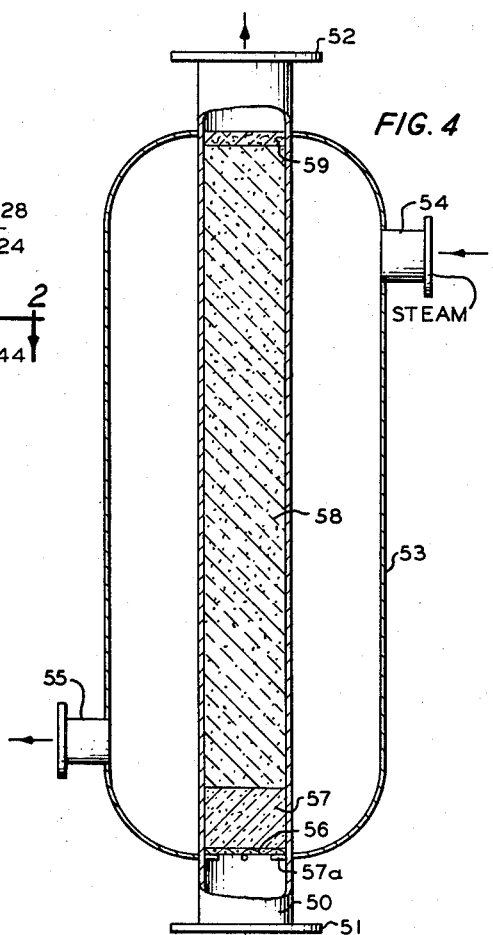
Figure 2:
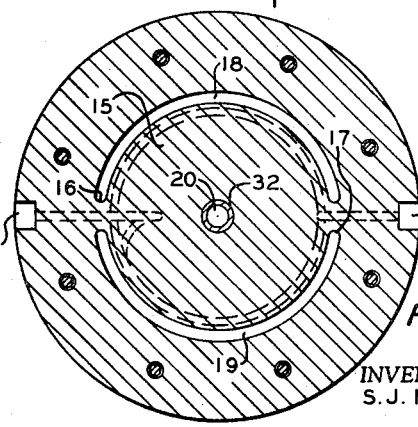
Figure 3:
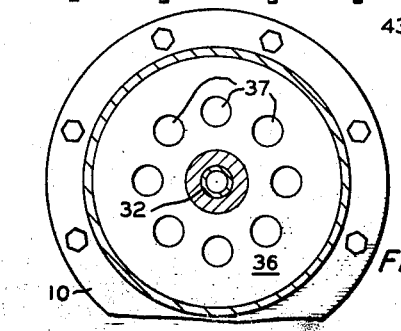

Referring to the drawings, Figure 1 is a longitudinal cross-sectional view of a filter apparatus of this invention. Figure 2 is a cross-sectional view taken along the line 2—2 in Figure 1. Figure 3 is a cross-sectional view taken along the line 3—3 in Figure 1. Figure 4 is a longitudinal cross-sectional view of a second filter apparatus of this invention.

Referring to Figures 1, 2 and 3 of the drawings, elongated cylindrical metal filter body 10 is closed at its lower end by end plate 11 attached to flange 12 by bolts 13a. The upper end of filter body 10 is closed by steam head 13 attached to flange 14. Steam head 13 is circular in cross section and has a large diameter hole corresponding to the internal diameter of filter body 10 through its center. Disc 15 having a diameter somewhat smaller than the diameter of the large hole through steam head 13 is mounted within the large hole in steam head 13 by means of spokes 16 and 17 in such a manner as to provide annular passages 18 and 19 for the passage of fluids from within filter body 10. Hole 20 is located in the center of disc 15.

Hydrocarbon head 21, having an outside diameter corresponding to the outside diameter of steam head 13, is mounted on steam head 13. Hydrocarbon head 21 has a large diameter hole through the center with the diameter of the hole corresponding to the internal diameter of filter body 10. Disc 22 of a diameter corresponding to disc 15 is mounted within the large hole in hydrocarbon head 21 by means of spokes 23 and 24 in a manner so as to provide annular passageways 25 and 26 for the flow of fluid from filter body 10 through annular passageways 18 and 19. Disc 22 is somewhat thicker than hydrocarbon head 21 and is mounted with its upper surface in the same horizontal plane as the top surface of hydrocarbon head 21. A hole corresponding to the same diameter as the diameter of hole 20 is drilled into disc 22 from the lower side for approximately two-thirds the thickness of disc 22 without coming through the upper side of disc 22. Hydrocarbon inlet passageway 27 is drilled radially through hydrocarbon head 21 and through spoke 23 to form an open communication with the hole drilled into disc 22 from its lower surface to thereby provide a path of flow through hole 20 in steam head 13. Passageway 28 provides for the withdrawal of hydrocarbon from the upper surface of disc 22 through spoke 24 and then through hydrocarbon head 21.

Filter cup 29 having an annular flange 30 on its open end is mounted on hydrocarbon head 21 by means of bolts 31 which also attach steam head 13 and hydrocarbon head 21 to flange 14 of filter body 10.

Filter body 10 is provided with an elongated tube 32 having an external diameter corresponding to the internal diameter of hole 20 and held in place along the centerline of filter body 10 by means of steam head 13 and end plate 11. Leakage of hydrocarbon from between hydrocarbon inlet 27 and tube 32 is prevented by gasket 33 mounted between the inlet end of tube 32 and shoulder 34 within disc 22. The outlet end of tube 32 is provided with a plurality of holes 35 for the flow of fluid from within tube 32. Circular support 36 having a plurality of small diameter holes 37 located therein is mounted within filter body 10 on tube 32 at a distance above holes 35 in tube 32 so as to provide inlet chamber 38 in the lower end of filter body 10. A layer of glass wool 39 covers circular support 36 and a layer of bauxite 40 is placed on top of glass wool layer 39. A body of purifying agent 41 is placed on top of bauxite layer 40 and fills filter body 10 up to the lower surface of steam head 13.

The body of purifying agent 41 is heated and maintained at an elevated temperature by means of steam which is circulated through heating coil 42 which is located within the body of purifying agent 41. Steam inlet 43 in steam head 13 and spoke 16 provides for the flow of steam into heating coil 42 and steam outlet 44 in steam head 13 and spoke 17 provides for the flow of condensate from heating coil 42.

In operation, the body of purifying agent 41 is heated to a temperature of approximately 200° C. by the flow of steam through steam inlet 43, heating coil 42 and condensate outlet 44. When the purifying agent 41, comprising an admixture of 1.0 pound of sodium chloride, 0.125 pound of the double salt of aluminum chloride-sodium chloride, and 0.5 pound of bauxite reaches reaction temperature for the formation of additional double salt, the hydrocarbon stream to be purified is introduced through hydrocarbon inlet 27 into tube 32 from which the hydrocarbon flows through holes 35 in tube 32 into inlet chamber 38 and then through glass wool layer 39 and bauxite layer 40 into the bed of purifying agent 41. Within the bed of purifying agent substantially all the aluminum chloride which is either dissolved or entrained in the hydrocarbon stream is removed by the formation of double salt with the sodium chloride in the purifying agent and, in addition, by solution in the double salt present in the purifying agent. The purified hydrocarbon flows from filter body 10 through steam head 13 by means of angular passageways 18 and 19 and then through hydrocarbon head 21 by means of passageways 25 and 26 into filter cup 29. If desired, the purified hydrocarbon can be passed through a ceramic filter 45 before being withdrawn from the apparatus. The purified hydrocarbon stream is withdrawn from filter cup 29 through hydrocarbon outlet 28.

Referring to Figure 4, a section of steel pipe 50, having flanges 51 and 52 attached to its opposite ends, is surrounded by steam jacket 53 which is welded at each end to pipe 50. Steam inlet 54 in steam jacket 53 provides for the introduction of steam around pipe 50 and condensate outlet 55 provides for the withdrawal of condensed steam from the steam jacket. Within pipe 50, screen 56, disposed transversely to the flow of fluid through pipe 50, is held in place within pipe 50 by means of pins 57a. A layer of bauxite particles 57 is placed upon screen 56. A body of purifying agent 58 is placed upon bauxite particles 57 and the loss of particles of purifying agent 58 prevented by a layer of glass wool 59 placed thereon.

The apparatus shown in Figure 4, when constructed for use with instrumentation devices, is constructed with pipe 50 having a one inch diameter and steam jacket 53 having a one and one-half inch diameter. Bauxite layer 57 is one inch in thickness and the length of the bed of purifying agent 58 is approximately 12 inches.

Example I

Sodium chloride of approximately 60 mesh size was admixed with bauxite to form a purifying agent which was placed within the apparatus shown in Figure 1 of the drawings. The purifying agent was heated to a temperature of 395° F. with 250 p.s.i. steam. A hydrocarbon stream containing aluminum chloride in small concentration and hydrogen chloride was passed through the apparatus to effect removal of the aluminum chloride. After 16 days of operation, the hydrocarbon outlet lines became plugged with aluminum chloride and ferric chloride. An examination of the purifying agent disclosed some evidence of double salt formation but the double salt formed filled the interstices and tended to block the flow of hydrocarbon therethrough. Thus, this purifying agent is not effective for the removal of metal halides from hydrocarbon streams containing the same.

Example II

A purifying agent comprising one pound of sodium chloride, 0.5 pound bauxite, and 0.125 pound of sodium chloride-aluminum chloride double salt was placed in the apparatus of Figure 1 and heated to a temperature of 395° F. using 250 p.s.i. steam. The sodium chloride had a particle size of 60 mesh and the bauxite had a particle size of 8 mesh. These components of the purifying agent were thoroughly mixed together before being placed in the filter apparatus. An isobutane isomerization effluent was passed through the purifying agent at a rate of about 135 cc./min. for a period of 80 days without evidence of line plugging and without affecting the hydrogen chloride content of the hydrocarbon stream. The hydrocarbon components of the isobutane isomerization effluent were determined before and after the filter apparatus by means of a chromatographic analyzer.

Example III

A purifying agent of the composition employed in Example II was placed in the filter apparatus shown in Figure 4 of the drawings. An isobutane isomerization effluent was placed in the apparatus and held there for 10 minutes at a temperature of 395° F. and a pressure of 34 p.s.i.g. An analysis of the isomerization effluent before being placed in the filter apparatus and after its removal therefrom is shown in the following table:

| Component | Before Filter, mol percent | After 10 min. in Filter, mol percent |
| --- | --- | --- |
| Propane | 2.0 | 2.0 |
| Isobutane | 53.0 | 53.3 |
| Normal butane | 45.0 | 44.9 |

These analyses were made with a chromatographic analyzer and the differences in butane and isobutane content are within the accuracy of the analyzer. From these data, it is concluded that the purifying agent caused no significant isomerization of the hydrocarbon sample. It is to be noted that the 10 minute period during which the hydrocarbon sample was retained in the filter apparatus is approximately 60 times longer than the normal residence time of 10 seconds for passing hydrocarbon effluent through the filter.

Reasonable variation and modification are possible within the scope of the foregoing disclosure, drawings and the claims to the invention, the essence of which is that there have been provided: first, a method for producing multiple salts of a Friedel-Crafts metal halide and alkali metal halides in an improved manner by reacting said Friedel-Crafts metal halide with said alkali metal halides at an elevated temperature in the presence of a small amount of a multiple salt of a Friedel-Crafts metal halide and alkali metal halides; second, a method for removing Friedel-Crafts metal halides from hydrocarbon streams by contacting said hydrocarbon streams at an elevated temperature with an alkali metal halide in finely divided form having dispersed therein a small amount of a multiple salt of a Friedel-Crafts metal halide and alkali metal halides; third, a purifying agent of novel composition for removing Friedel-Crafts metal halides from hydrocarbon streams without substantially altering the composition of the hydrocarbon stream; and fourth, filtering apparatus containing the purifying agent of this invention for purifying hydrocarbon streams to remove Friedel-Crafts metal halides therefrom.

I claim:

1. A process for forming multiple salts of a Friedel-Crafts type metal halide and alkali metal halide comprising reacting a hydrocarbon stream containing said Friedel-Crafts type metal halide with an excess of alkali metal halides selected from the left-hand column of Group I of the periodic system, promoted with a multiple salt of Friedel-Crafts type metal halide and said alkali metal halides at an elevated temperature to form said multiple salt, said multiple salt being dispersed in said excess of alkali metal halide, and recovering said multiple salt as product of the process.

2. The process of claim 1 where said reaction is conducted at a temperature in the range of 100° C. to 350° C.

3. The process of claim 1 wherein the anion of said Friedel-Crafts type metal halide is the same as the anion of said alkali metal halide.

4. The process of claim 1 wherein the anion of said Friedel-Crafts type metal halide is different from the anion of said alkali metal halide.

5. The process of claim 1 wherein said Friedel-Crafts type metal halide is aluminum chloride and said alkali metal halide is sodium chloride.

6. The process of claim 1 wherein said Friedel-Crafts type metal halide is ferric chloride and said alkali metal halide is sodium chloride.

7. The process of claim 1 wherein said Friedel-Crafts type metal halide is aluminum chloride and said alkali metal halide is lithium chloride.

8. The process of claim 1 wherein said Friedel-Crafts type metal halide is ferric chloride and said alkali metal halide is lithium chloride.

9. The process of claim 1 wherein said alkali metal halide promoted with said multiple salt is admixed with an inert contact material.

10. In a conversion process wherein conversion is effected in the presence of a Friedel-Crafts type metal halide catalyst and wherein an effluent from a reaction zone contains a minor amount of said metal halide, the improvement comprising filtering said reaction effluent containing said metal halide through an excess of a mass of finely divided alkali metal halide having dispersed therein a double salt of a Friedel-Crafts type metal halide and an alkali metal halide at an elevated temperature, and recovering the filtered effluent substantially free from said Friedel-Crafts type metal halide catalyst.

11. The improvement of claim 10 wherein said finely divided alkali metal halide is admixed with a finely divided inert contact material.

12. The improvement of claim 10 wherein said Friedel-Crafts type metal halide is aluminum chloride, said alkali metal halide is sodium chloride, and said double salt is $AlCl_3 \cdot NaCl$.

13. The improvement of claim 10 wherein said Friedel-Crafts type metal halide is ferric chloride, said alkali metal halide is sodium chloride, and said double salt is $FeCl_3 \cdot NaCl$.

14. The improvement of claim 10 wherein said Friedel-Crafts type metal halide is aluminum chloride, said alkali metal halide is lithium chloride, and said double salt is $AlCl_3 \cdot LiCl$.

15. The improvement of claim 10 wherein said Friedel-Crafts type metal halide is ferric chloride, said alkali metal halide is lithium chloride, and said double salt is $FeCl_3 \cdot LiCl$.

16. The improvement of claim 11 wherein said inert contact material is bauxite.

17. The process which comprises intimately contacting the reaction effluent from a hydrocarbon conversion catalyzed by a Friedel-Crafts type metal halide catalyst, which effluent contains some of said metal halide and hydrocarbon, with an excess of an alkali metal halide in finely divided form having dispersed therein a double salt of a Friedel-Crafts type metal halide and an alkali metal halide, said contacting being effected at an elevated temperature in the range of 100° C. to 350° C., for a period of time sufficient to effect substantially complete removal of said catalyst from said effluent without effecting substantial removal of said hydrocarbon.

18. The process which comprises intimately contacting the reaction effluent from a hydrocarbon conversion catalyzed by an aluminum chloride catalyst, which effluent contains some of said aluminum chloride catalyst, hydrocarbon, and hydrogen chloride, with an excess of an admixture of sodium chloride and bauxite in finely divided form having dispersed therein a minor amount of a double salt of aluminum chloride and sodium chloride, said contacting being effected at an elevated temperature in the range of 100° C. to 350° C. for a period of time of at least 15 minutes, to thereby effect substantially complete removal of said aluminum chloride catalyst from said effluent without effecting substantial removal of said hydrogen chloride and said hydrocarbon.

19. A filter for removing Friedel-Crafts type metal halide catalyst from a fluid stream comprising an enclosed casing having inlet and outlet means for the introduction of said fluid stream into said casing and removal therefrom, a filter medium of finely divided alkali metal halide having dispersed therein a double salt of a Friedel-Crafts type metal halide and an alkali metal halide disposed within said casing and arranged for the passage of said fluid stream therethrough, and a heat exchanger means arranged to maintain said fluid stream at an elevated temperature.

20. A filter comprising a cylindrical casing having closed upper and lower ends, a tube axially disposed within said casing, a perforated wall transversely disposed within said casing and dividing the same into an inlet chamber and a contact chamber, said tube axially passing through said wall and in communication at its lower end with said inlet chamber, filter medium disposed within said contact chamber, said filter medium comprising finely divided alkali metal halide having dispersed therein a double salt of a Friedel-Crafts type metal halide and an alkali metal halide, a heating coil disposed with said filter medium, inlet means in the upper end of said casing and communicating with the upper end of said tubing, and outlet means in the upper end of said casing and communicating with said contact chamber.

References Cited in the file of this patent
UNITED STATES PATENTS

| | | |
|---|---|---|
| 2,291,376 | Cheney | July 28, 1942 |
| 2,332,275 | Stahly | Oct. 19, 1943 |
| 2,442,418 | Latchum et al. | June 1, 1948 |
| 2,779,714 | Keith | Jan. 29, 1957 |